(12) United States Patent
Zhang et al.

(10) Patent No.: US 12,210,166 B2
(45) Date of Patent: Jan. 28, 2025

(54) BEAM OPTICAL AXIS SELF-STABILIZING DEVICE AND METHOD BASED ON REFLECTION MECHANICAL MODULATION

(71) Applicant: SOOCHOW UNIVERSITY, Suzhou (CN)

(72) Inventors: Xiang Zhang, Suzhou (CN); Fan Gao, Suzhou (CN); Nian Zhang, Suzhou (CN); Xiao Yuan, Suzhou (CN); Baoxing Xiong, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 515 days.

(21) Appl. No.: 17/642,695

(22) PCT Filed: Jan. 22, 2021

(86) PCT No.: PCT/CN2021/073332
§ 371 (c)(1),
(2) Date: Mar. 13, 2022

(87) PCT Pub. No.: WO2022/151522
PCT Pub. Date: Jul. 21, 2022

(65) Prior Publication Data
US 2023/0152600 A1     May 18, 2023

(30) Foreign Application Priority Data
Jan. 14, 2021 (CN) .......................... 202110049302.8

(51) Int. Cl.
*G02B 27/28* (2006.01)
*G02B 27/14* (2006.01)

(52) U.S. Cl.
CPC .......... *G02B 27/283* (2013.01); *G02B 27/14* (2013.01); *G02B 27/286* (2013.01)

(58) Field of Classification Search
CPC ..... G02B 27/283; G02B 27/14; G02B 27/286
(Continued)

(56) References Cited

U.S. PATENT DOCUMENTS 4,812,639 A  *  3/1989  Byren ................... G01B 11/27
                                                356/139.05
7,599,069 B2 * 10/2009  Toussaint, Jr. ....... G02B 27/286
                                                353/20
(Continued)

FOREIGN PATENT DOCUMENTS

CN        1580872 A      2/2005
CN        1588169 A      3/2005
(Continued)

*Primary Examiner* — Sharrief I Broome
(74) *Attorney, Agent, or Firm* — SZDC Law PC

(57) ABSTRACT

The invention provides a beam optical axis self-stabilizing device and method based on reflection mechanical modulation. The device includes a polarized beam splitter, a quarter-wave plate, a structural reflecting element, and a driving source. The quarter-wave plate is located at an output end of the polarized beam splitter. The reflecting element is located at a side of the quarter-wave plate away from the polarized beam splitter. The driving source drives the structural reflecting element to rotate at a uniform speed with an optical axis as an axis. Incident light passes through the polarized beam splitter to obtain split light. The split light passes through the quarter-wave plate to enter the structural reflecting element. The structural reflecting element rotates so that the phase of reflected light varies with time. The reflected light is modulated by the quarter-wave plate and emitted through the polarized beam splitter, and a target beam is obtained.

10 Claims, 2 Drawing Sheets

(58) Field of Classification Search
USPC .................................................. 359/489.08
See application file for complete search history.

(56) References Cited

U.S. PATENT DOCUMENTS

| 2006/0114542 | A1* | 6/2006 | Bloom | ................... | G02B 26/06 |
| | | | | | 359/276 |
| 2006/0187518 | A1* | 8/2006 | Bloom | ................... | G02B 26/06 |
| | | | | | 359/245 |
| 2010/0118242 | A1* | 5/2010 | Barocsi | ............ | G02F 1/133528 |
| | | | | | 349/119 |

FOREIGN PATENT DOCUMENTS

| CN | 101178477 A | 5/2008 |
| CN | 106324828 A | 1/2017 |

* cited by examiner

BEAM OPTICAL AXIS SELF-STABILIZING DEVICE AND METHOD BASED ON REFLECTION MECHANICAL MODULATION

This application is the National Stage Application of PCT/CN2021/073332, filed on Jan. 22, 2021, which claims priority to Chinese Patent Application No. 202110049302.8, filed on Jan. 14, 2021, which is incorporated by reference for all purposes as if fully set forth herein.

FIELD OF THE INVENTION

The present invention relates to the field of optical technologies, and more particularly to a beam optical axis self-stabilizing device based on reflection mechanical modulation and a self-stabilization method.

DESCRIPTION OF THE RELATED ART

An intense laser is subject to various atmospheric influences during propagation in atmosphere. Atmospheric transmission effects may include linear effects and nonlinear effects. The former includes atmospheric refraction, atmospheric absorption and scattering, atmospheric turbulence, and the like. The atmospheric absorption and scattering attenuates laser power. The atmospheric turbulence degrades the quality of a laser beam. The latter mainly includes influences such as stimulated Raman scattering, thermal corona, and breakdown.

The intensity uniformity and directivity of the laser beam are mainly affected by the nonuniformity of the spatial refractive index of a transmission medium when a laser beam propagates through the atmosphere at a long-distance. At first, the intensity distribution and the directivity of the beam are slightly changed by the spatial non-uniform refractive index at a short distance. However, the intensity distribution uniformity and the directivity of the beam are drastically altered because of the accumulation of the turbulence effects with the increase of the propagation distance.

To make an intense laser beam overcome atmospheric influences to implement remote propagation with high beam quality and provide a target surface with adequate stability of a focal spot centroid and a high focusable power, a common method at present is to use adaptive optics technologies to apply compensation control on a deformable mirror according to wavefront aberration of beacon light detection. The adaptive optics technologies effectively overcome the aberration disturbance of the intense laser beam by atmospheric turbulence and mitigate the effects of thermal corona to a certain extent, which have been proven to some extent in various high-energy laser systems. However, the response time of an adaptive optics system is in the order of about several milliseconds or even ten milliseconds, and the adaptive optics system is complex in structure, expensive in manufacturing and maintenance, and complex in application to meet the requirements of equipment. In another aspect, small-scale, fast-response phase aberrations caused by complex effects in various high-energy laser systems, for example, mm-scale spatial modulation and phase aberrations caused by coolant turbulence in immersion laser systems, may greatly affect initial beam quality of intense laser beams, which are also difficult to solve by using the adaptive optics technologies.

SUMMARY OF THE INVENTION

A technical problem to be solved by the present invention is to provide a beam optical axis self-stabilizing device based on reflection mechanical modulation and a self-stabilization method. A beam obtained in the present invention has stable focal spot centroid and consistent beam directivity, and in addition the beam has a higher focusable power and energy concentration ratio.

To resolve the technical problems, the present invention provides a beam optical axis self-stabilizing device based on reflection mechanical modulation, including a polarized beam splitter, a quarter-wave plate, a structural reflecting element, and a driving source. The quarter-wave plate is located at an output end of the polarized beam splitter, the structural reflecting element is located at a side of the quarter-wave plate away from the polarized beam splitter, and the driving source is used for driving the structural reflecting element to rotate at a uniform speed on the axis of the optical axis.

The incident light passes through the polarized beam splitter to obtain split light, the split light passes through the quarter-wave plate to enter the structural reflecting element, the structural reflecting element rotates so that the phase of reflected light varies with time, and the reflected light is modulated by the quarter-wave plate and is emitted through the polarized beam splitter, and a target beam is obtained.

Preferably, the structural reflecting element is a pyramid prism or a binary optical element.

Preferably, the incident light is a plane wave, a Gaussian beam or a vortex beam.

Preferably, the incident light is a collimated light, converging light or diverging light.

Preferably, the driving source is a motor or a rotating cylinder.

Preferably, the device further includes a first expanded beam collimation system, where the incident light passes through the first expanded beam collimation system to enter the polarized beam splitter, and the first expanded beam collimation system includes a first convex lens and a second convex lens, and a distance between the first convex lens and the second convex lens is equal to a sum of a focal length of the first convex lens and a focal length of the second convex lens.

Preferably, the device further includes a first expanded beam collimation system, where the incident light passes through the first expanded beam collimation system to enter the polarized beam splitter, and the first expanded beam collimation system includes a first concave lens and a third convex lens, and a distance between the first concave lens and the third convex lens is equal to a difference between a focal length of the third convex lens and a focal length of the first concave lens.

Preferably, a second expanded beam collimation system is further disposed at a side of the polarized beam splitter, and a beam that is modulated by the quarter-wave plate and propagated through the polarized beam splitter. Meanwhile, the beam is collimated and emitted by the second expanded beam collimation system so that a target beam is obtained.

The present invention also provides an optical system, including the foregoing beam optical axis self-stabilizing device based on reflection mechanical modulation.

The present invention further provides a beam optical axis self-stabilization method implemented based on reflection mechanical modulation, implemented by using the foregoing beam optical axis self-stabilizing device based on reflection mechanical modulation.

The beneficial effects of the present invention are as follows:

1. The present invention provides a beam rotation device. The device uses a mechanical modulation method. That is, a phase of a beam moves at a high speed with time. Light passes through every part in a beam aperture during propagation, to ensure that phase delays of the light during propagation are kept consistent.

2. A beam obtained in the present invention has stable focal spot centroid and consistent beam directivity, and in addition the beam has a higher focusable power and energy concentration ratio.

Figure 1:
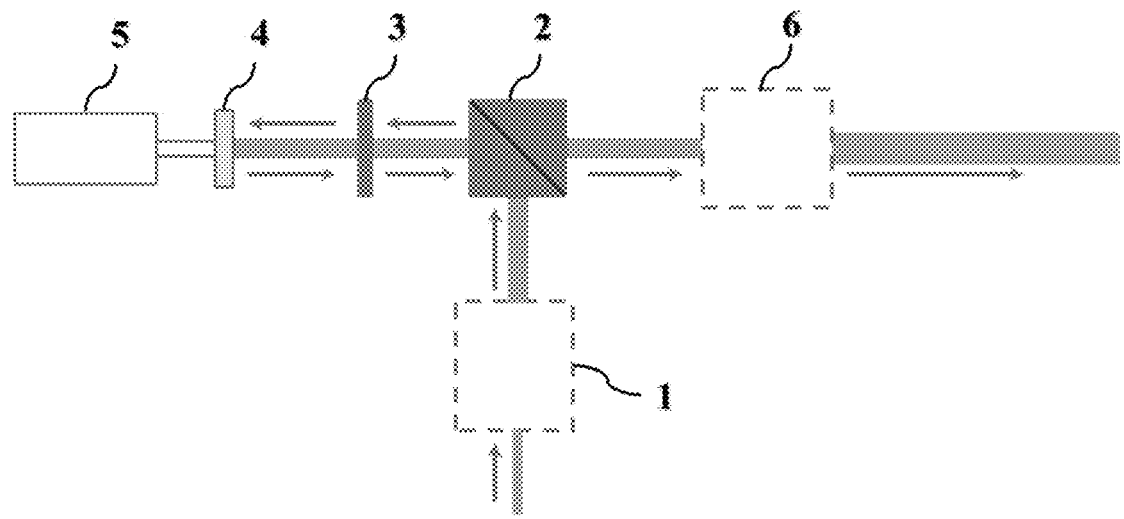
FIG. 1 is a schematic diagram of a beam optical axis self-stabilizing device based on reflection mechanical modulation according to the present invention.

Reference numerals: 1. first expanded beam collimation system; 2. polarized beam splitter; 3. quarter-wave plate; 4. structural reflecting element; 5. driving source; 6. second expanded beam collimation system; 7. first convex lens; 8. second convex lens; 9. first concave lens; 10. third convex lens; 11. fourth convex lens; 12. fifth convex lens; 13. second concave lens; and 14. sixth convex lens.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 2:
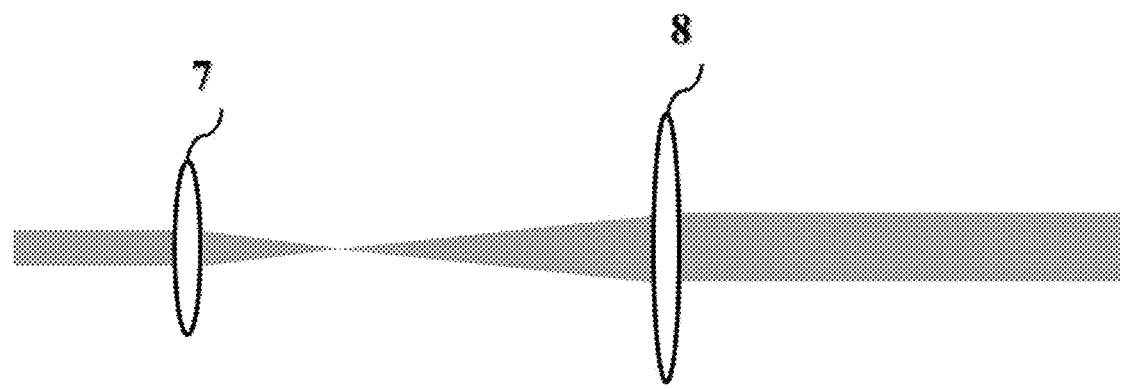
FIG. 2 is a schematic diagram 1 of a first expanded beam collimation system according to the present invention.
Figure 3:
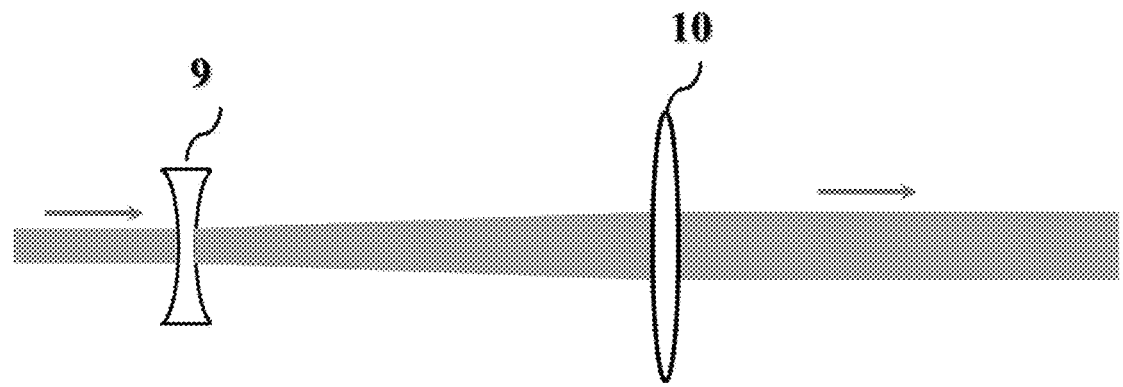
FIG. 3 is a schematic diagram 2 of a first expanded beam collimation system according to the present invention.
Figure 4:
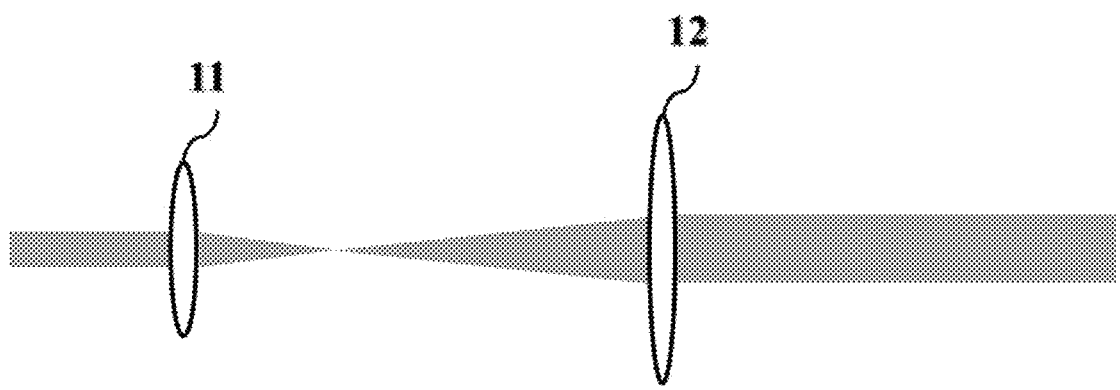
FIG. 4 is a schematic diagram 1 of a second expanded beam collimation system according to the present invention.
Figure 5:
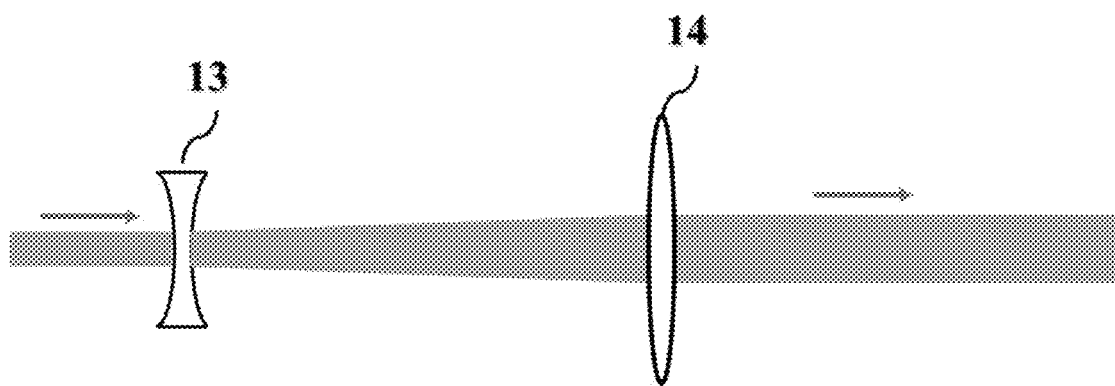
FIG. 5 is a schematic diagram 2 of a second expanded beam collimation system according to the present invention.

Referring to FIG. 1 to FIG. 3, the present invention provides a beam optical axis self-stabilizing device based on reflection mechanical modulation, including a polarized beam splitter 2, a quarter-wave plate 3, a structural reflecting element 4, and a driving source 5. The quarter-wave plate 3 is located at an output end of the polarized beam splitter 2. The structural reflecting element 4 is located at a side of the quarter-wave plate 3 away from the polarized beam splitter 2. The driving source 5 drives the structural reflecting element 4 to rotate at a uniform speed with an optical axis as an axis. Incident light passes through the polarized beam splitter 2 to obtain split light. The split light passes through the quarter-wave plate 3 to enter the structural reflecting element 4. The structural reflecting element 4 rotates so that the phase of reflected light varies with time. The reflected light is modulated by the quarter-wave plate 3 and emitted through the polarized beam splitter 2, and a target beam is obtained.

Specifically, the structural reflecting element 4 may be a pyramid prism or a binary optical element.

The incident light is a plane wave, a Gaussian beam or a vortex beam. The incident light is a collimated light, converging light or diverging light.

The driving source 5 is a motor or a rotating cylinder. The driving source 5 may drive the structural reflecting element 4 to rotate. For example, an electric spindle or a pneumatic spindle may be connected to the structural reflecting element 4 to implement the rotation of the structural reflecting element.

The present invention further includes a first expanded beam collimation system 1. The incident light passes through the first expanded beam collimation system 1 to enter the polarized beam splitter 2. The first expanded beam collimation system 1 includes a first convex lens 7 and a second convex lens 8. A distance between the first convex lens 7 and the second convex lens 8 is equal to a sum of a focal length of the first convex lens 7 and a focal length of the second convex lens 8. That is, the first expanded beam collimation system 1 is a "convex-convex" lens combination. In another embodiment, the first expanded beam collimation system 1 include a first concave lens 9 and a third convex lens 10. A distance between the first concave lens 9 and the third convex lens 10 is equal to a difference between a focal length of the third convex lens 10 and a focal length of the first concave lens 9. That is, the first expanded beam collimation system 1 is a "concave-convex" lens combination.

The second expanded beam collimation system 6 is further disposed at a side of the polarized beam splitter 2. A beam that is modulated by the quarter-wave plate 3 and propagates through the polarized beam splitter 2, is collimated and emitted by the second expanded beam collimation system 6, to obtain the target beam. The second expanded beam collimation system 6 may also be a "convex-convex" lens combination or a "concave-convex" lens combination. The second expanded beam collimation system 6 includes a fourth convex lens 11 and a fifth convex lens 12. Beam expansion is implemented by using a combination of the fourth convex lens 11 and the fifth convex lens 12. In another embodiment, the second expanded beam collimation system 6 may also include a second concave lens 13 and a sixth convex lens 14. Beam expansion is implemented by using a combination of the second concave lens 13 and the sixth convex lens 14. The expansion and collimation principles of the second expanded beam collimation system 6 are the same as those of the first expanded beam collimation system.

The first expanded beam collimation system 1 and the second expanded beam collimation system 6 may expand and collimate a beam. An input beam aperture of the first expanded beam collimation system 1 depends on a ratio of focal lengths of a lens pair. A divergence angle depends on a distance between the lens pair. An output beam aperture of the second expanded beam collimation system 6 depends on a ratio of focal lengths of a lens pair. A divergence angle depends on a distance between the lens pair.

In the present invention, an incident beam passes through the first expanded beam collimation system 1 to control a spot size and a divergence angle of the incident beam, to enter the polarized beam splitter 2 and the quarter-wave plate 3, and then enters the rotating structural reflecting element. A reflected beam passes through the quarter-wave plate 3 again. It is ensure that an angle between an optical axis of the quarter-wave plate 3 and a polarization direction of an initial beam is 45 degrees, so that the reflected beam can be efficiently transmitted through the polarized beam splitter 2. The second expanded beam collimation system 6 is configured to control a spot size and a divergence angle of the output beam.

A continuous wave laser with a wavelength of 532 nm is taken as an example. The focal length of the first convex lens 7 is 50 mm, and the focal length of the second convex lens 8 is 150 mm. After light enters the first expanded beam collimation system 1, a spot that enters the polarized beam splitter 2 has a diameter of 5 mm (in this embodiment, only a circular spot is used as an example, but the shape of the spot is not limited to a circular shape, and the shape may be a rectangular shape or another shape). A beam that passes through the polarized beam splitter 2 and the quarter-wave plate 3 enters the pyramid prism. The pyramid prism is driven by the motor to drive (a rotational speed of the motor is about 20,000 revolutions per minute, a power supply frequency is 50 Hz, and the diameter of the pyramid prism is 12.7 mm). After the reflected beam passes through the quarter-wave plate 3 and the polarized beam splitter 2 again, the beams passes through the second expanded beam collimation system 6 (a focal length of the fourth convex lens 11 is 100 mm, and a focal length of the fifth convex lens 12 is 200 mm) to control a spot size and a divergence angle of an outgoing beam.

By means of the foregoing device, stable focal spot centroid and consistent beam directivity may be formed, and the beam has a higher focusable power and energy concentration ratio.

The present invention provides an optical system, including the foregoing beam optical axis self-stabilizing device based on reflection mechanical modulation. In the system, the structural reflecting element 4 is rotated at a high speed to enable a phase of a beam varying at a high speed with time. Light passes through every part in a beam aperture during transmission, to ensure that phase delays of the light during transmission are kept consistent, to obtain a beam with stable focal spot centroid and consistent directivity. Furthermore, the beam has a higher focusable power and energy concentration ratio.

The present invention further provides a beam optical axis self-stabilization method implemented based on reflection mechanical modulation, implemented by using the foregoing beam optical axis self-stabilizing device.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A beam optical axis self-stabilizing device based on reflection mechanical modulation, comprising a polarized beam splitter, a quarter-wave plate, a structural reflecting element, and a driving source, the quarter-wave plate being located at an output end of the polarized beam splitter, the structural reflecting element being located at a side of the quarter-wave plate away from the polarized beam splitter, and the driving source being used for driving the structural reflecting element to rotate at a uniform speed on the axis of the optical axis, wherein incident light passes through the polarized beam splitter to obtain split light, the split light passes through the quarter-wave plate to enter the structural reflecting element, the structural reflecting element rotates so that a phase of reflected light varies with time, and the reflected light is modulated by the quarter-wave plate and emitted through the polarized beam splitter, and a target beam is obtained.

2. The beam optical axis self-stabilizing device based on reflection mechanical modulation according to claim 1, wherein the structural reflecting element is a pyramid prism or a binary optical element.

3. The beam optical axis self-stabilizing device based on reflection mechanical modulation according to claim 1, wherein the incident light is a plane wave, a Gaussian beam or a vortex beam.

4. The beam optical axis self-stabilizing device based on reflection mechanical modulation according to claim 1, wherein the incident light is a collimated light, converging light or diverging light.

5. The beam optical axis self-stabilizing device based on reflection mechanical modulation according to claim 1, wherein the driving source is a motor or a rotating cylinder.

6. The beam optical axis self-stabilizing device based on reflection mechanical modulation according to claim 1, wherein the device further comprises a first expanded beam collimation system, wherein the incident light passes through the first expanded beam collimation system to enter the polarized beam splitter, and the first expanded beam collimation system comprises a first convex lens and a second convex lens.

7. The beam optical axis self-stabilizing device based on reflection mechanical modulation according to claim 1, wherein the device further comprises a first expanded beam collimation system, wherein the incident light passes through the first expanded beam collimation system to enter the polarized beam splitter, and the first expanded beam collimation system comprises a first concave lens and a third convex lens.

8. The beam optical axis self-stabilizing device based on reflection mechanical modulation according to claim 1, wherein a second expanded beam collimation system is further disposed at a side of the polarized beam splitter, and a beam that is modulated by the quarter-wave plate and propagated through the polarized beam splitter is collimated and emitted by the second expanded beam collimation system to obtain the target beam.

9. An optical system, comprising the beam optical axis self-stabilizing device based on reflection mechanical modulation according to claim 1.

10. A beam optical axis self-stabilization method based on reflection mechanical modulation, wherein the method is implemented by using the beam optical axis self-stabilizing device based on reflection mechanical modulation according to claim 1.

* * * * *